United States Patent [19]
Zemel

[11] Patent Number: 6,106,403
[45] Date of Patent: Aug. 22, 2000

[54] PORTABLE ENCLOSURE FOR TOYS AND SAND

[76] Inventor: Helaine Zemel, 3771 Meadowbrook Blvd., University Heights, Ohio 44118

[21] Appl. No.: 09/373,517

[22] Filed: Aug. 12, 1999

Related U.S. Application Data

[60] Provisional application No. 60/098,872, Sep. 2, 1998, abandoned.

[51] Int. Cl.⁷ .................................................. A63G 31/00
[52] U.S. Cl. .......................................... 472/126; 422/104
[58] Field of Search ..................................... 472/126, 137; 422/102, 104; 312/1

[56] References Cited

U.S. PATENT DOCUMENTS

| | | | |
|---|---|---|---|
| 3,084,684 | 4/1963 | Saunders | 422/104 |
| 4,876,773 | 10/1989 | Wade | 422/104 |
| 5,316,733 | 5/1994 | Rune et al. | |

*Primary Examiner*—Kien T. Nguyen
*Attorney, Agent, or Firm*—Fay, Sharpe, Fagan, Minnich & McKee, LLP

[57] ABSTRACT

A no-mess portable enclosure is adapted for holding sand and/or toys and facilitates play with the sand and/or toys without allowing same to escape the enclosure. The enclosure is usable indoors or outdoors and is easily portable from one location to another without fear that the sand or other contents will be spilled. The enclosure is highly aesthetically pleasing and enhances the surrounding area. Also, it is usable by multiple people simultaneously. The no-mess play area includes an enclosure defining a hollow interior region adapted for receipt of sand, toys, and the like, wherein at least a portion of the enclosure is defined from a transparent material. At least first and second arm access assemblies are connected to the enclosure and are spaced relative to each other so as to be adapted for respective simultaneous receipt of left and right arms of a child or other user. The arm access assemblies each include a flexible sleeve having a first end sealingly positioned in an opening in the enclosure and a closed second end extending into the hollow interior region of the enclosure. Each of the sleeves is adapted for receipt of one of the left and right arms of the first child.

17 Claims, 5 Drawing Sheets

PORTABLE ENCLOSURE FOR TOYS AND SAND

This application claims the benefit of provisional Application Ser. No. 60/098,872 filed on Sep. 2, 1998 now abandoned.

BACKGROUND OF THE INVENTION

The present invention relates generally to the field of children's toys. More particularly, the invention relates to a portable enclosure for toys and/or sand adapted for use by children or others in a manner that prevents spillage of the sand or toys without reducing the enjoyment to the user. The present invention further relates to a method of play that provides entertainment and enjoyment without the attendant mess associated with conventional play areas such as sand boxes.

Children of all ages love to play in the sand. Sand is a stimulating, creative and inventive tool. Sandboxes provide children with hours of fun and education. Unfortunately, while playing in traditional sandboxes, children get sand on themselves and the play area, which is very messy and difficult to clean-up. Also, conventional sand boxes are not freely portable without concern of spilling sand and/or toys therefrom.

Similarly, when using toys, such as interconnectable building blocks and the like, children typically scatter the toys throughout a room or other area. This, obviously, is unattractive, results in lost toy pieces, and can present a dangerous situation due to the chance that a child at play will stumble over a misplaced toy.

Also, conventional sand boxes are not suited for indoor use because they are unsightly and messy. Therefore, they are used outdoors which prevents use during inclement weather or at night. Furthermore, sand in conventional outdoor sandboxes is easily contaminated.

In light of the foregoing specifically noted deficiencies and others associated with conventional sand boxes and play areas, a need has been identified for a no-mess indoor enclosure adapted for holding sand and/or toys that facilitates play with the sand or toys without allowing same to escape or be removed from the enclosure. A need has also been identified for such an enclosure that is usable indoors or outdoors and that is easily portable from one location to another without fear that the contents will be spilled. Also, a need has been identified for such a no-mess indoor portable sandbox and toy enclosure that is highly aesthetically pleasing so that it enhances the surrounding area, and that is usable by multiple people simultaneously.

SUMMARY OF THE INVENTION

In accordance with the present invention, a no-mess portable enclosure for toys and sand is provided.

In accordance with a first aspect of the present invention, a method of providing a no-mess play area for children includes providing a substantially transparent enclosure defining a hollow interior region, placing sand within the hollow interior region, and sealing the enclosure to prevent escape of the sand therefrom. A first pair of arm access assemblies is provided and includes first and second arm access assemblies connected to the enclosure and spaced relative to each other so as to be adapted for respective simultaneous receipt of left and right arms of a first child. Each of the arm access assemblies includes a flexible sleeve sealingly positioned in an opening in the enclosure and extending into the hollow interior region. Each of the sleeves defines a passage adapted for receipt of one of the left and right arms of the first child and a closed innermost end within the hollow interior region.

In accordance with another aspect of the present invention, a method of playing with sand includes partially filling a hollow interior region of an enclosure with sand, the enclosure including at least a transparent portion. At least one arm access assembly is provided for accessing the hollow interior region for purposes of manipulating the sand. The arm access assembly includes a sleeve adapted for receipt of an arm of a user. An arm and hand of a user, such as a child, is placed into the sleeve, which is closed to the hollow interior region of the enclosure to prevent direct contact between the user's hand and the sand. The user plays with the sand with his/her hand by indirect contact between the sand and his/her hand through the sleeve while simultaneously viewing the sand and the sleeve through the transparent portion of the enclosure.

In accordance with still another aspect of the present invention, a no-mess play area for children includes an enclosure defining a hollow interior region adapted for receipt of sand, wherein at least a portion of the enclosure is defined from a transparent material. A first pair of arm access assemblies, including first and second arm access assemblies, is connected to the enclosure and the first and second assemblies are spaced relative to each other so as to be adapted for respective simultaneous receipt of left and right arms of a first child. Each of the arm access assemblies includes a flexible sleeve having a first end sealingly positioned in an opening in the enclosure and a closed second end extending into the hollow interior region of the enclosure. Each of the sleeves is adapted for receipt of one of the left and right arms of the first child.

In accordance with a yet further aspect of the present invention, a play area includes sand and a closed container formed of panels including top, bottom, and side panels that define a hollow interior chamber for holding the sand. First and second openings are defined in one of the panels, and the openings are proportioned to receive a child's left and right hands and arms, respectively. First and second flexible sleeves are affixed to the openings and extend into the hollow interior region enclosed by the container, wherein the sleeves adapted for respective receipt of said child's left and right hands and arms and define a closed innermost end.

One advantage of the present invention resides in the provision of a novel, self-contained, portable no-mess sandbox and toy enclosure that allows children and others to have hours of enjoyment, alone or simultaneously with others, while eliminating the mess commonly associated with sandboxes and use of toys.

Another advantage of the present invention is found in the provision of a no-mess portable enclosure for sand and toys that is usable indoors, thereby allowing children and other users to enjoy the sandbox and toys throughout the year in any weather conditions.

A further advantage of the present invention resides in the provision of an enclosure for sand and toys that is easily movable without requiring removal of the sand/toys and without requiring attachment of separate cover members or the like.

Still another advantage of the present invention is the provision of a no-mess indoor portable sandbox that is simple and cost-effective to construct.

Still other benefits and advantages of the present invention will become apparent to those of ordinary skill in the art to which the invention pertains upon reading and understanding the following specification.

BRIEF DESCRIPTION OF THE DRAWINGS

The invention may take form in various components and arrangements of components, and in various steps and arrangements of steps, preferred embodiments of which are illustrated in the accompanying drawings that form a part hereof and wherein.

DETAILED DESCRIPTION OF PREFERRED EMBODIMENTS

Figure 1:
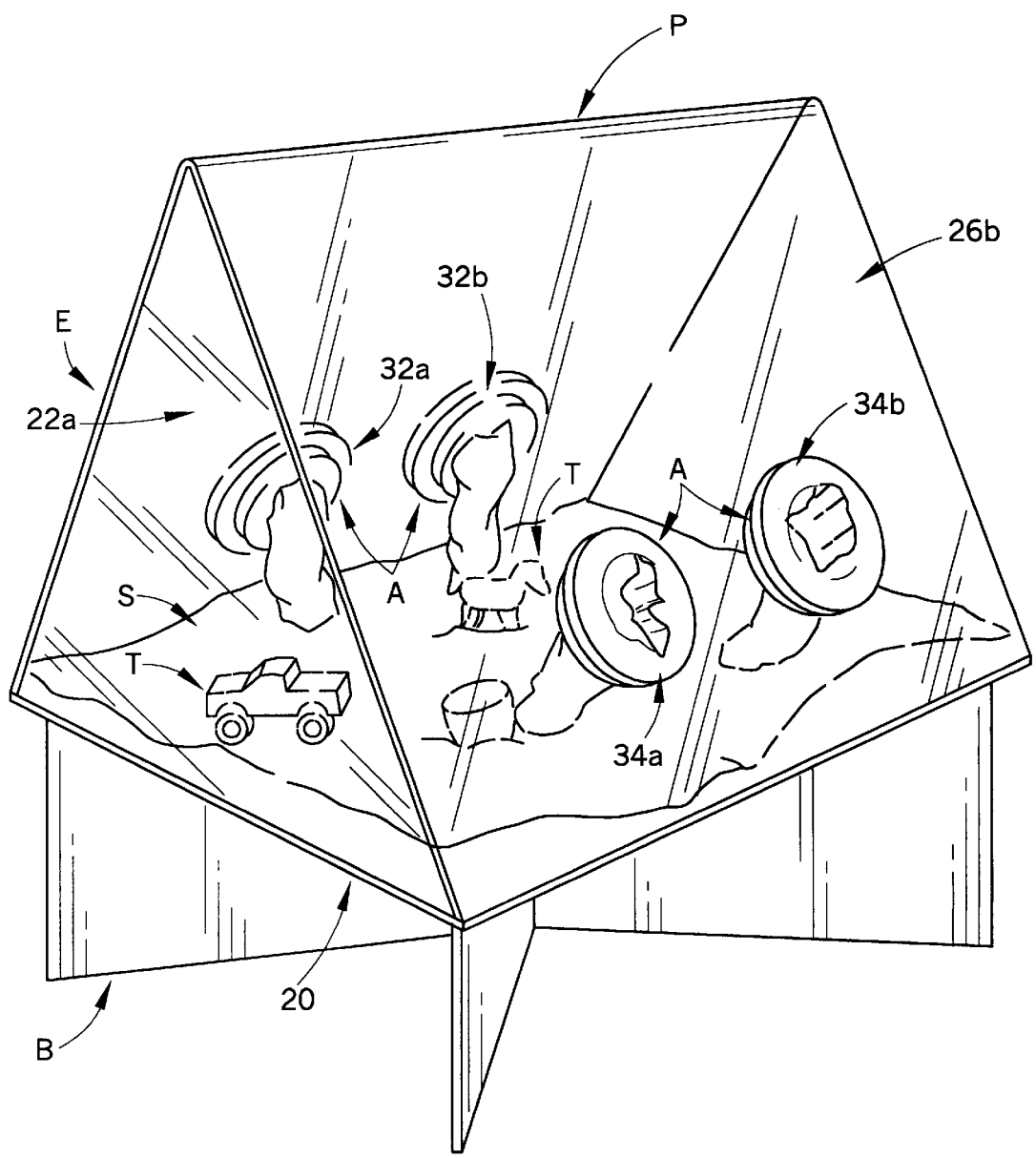
FIG. 1 is a perspective view of a portable enclosure for sand and toys formed in accordance with the present invention including sand and toys therein.
Figure 2:
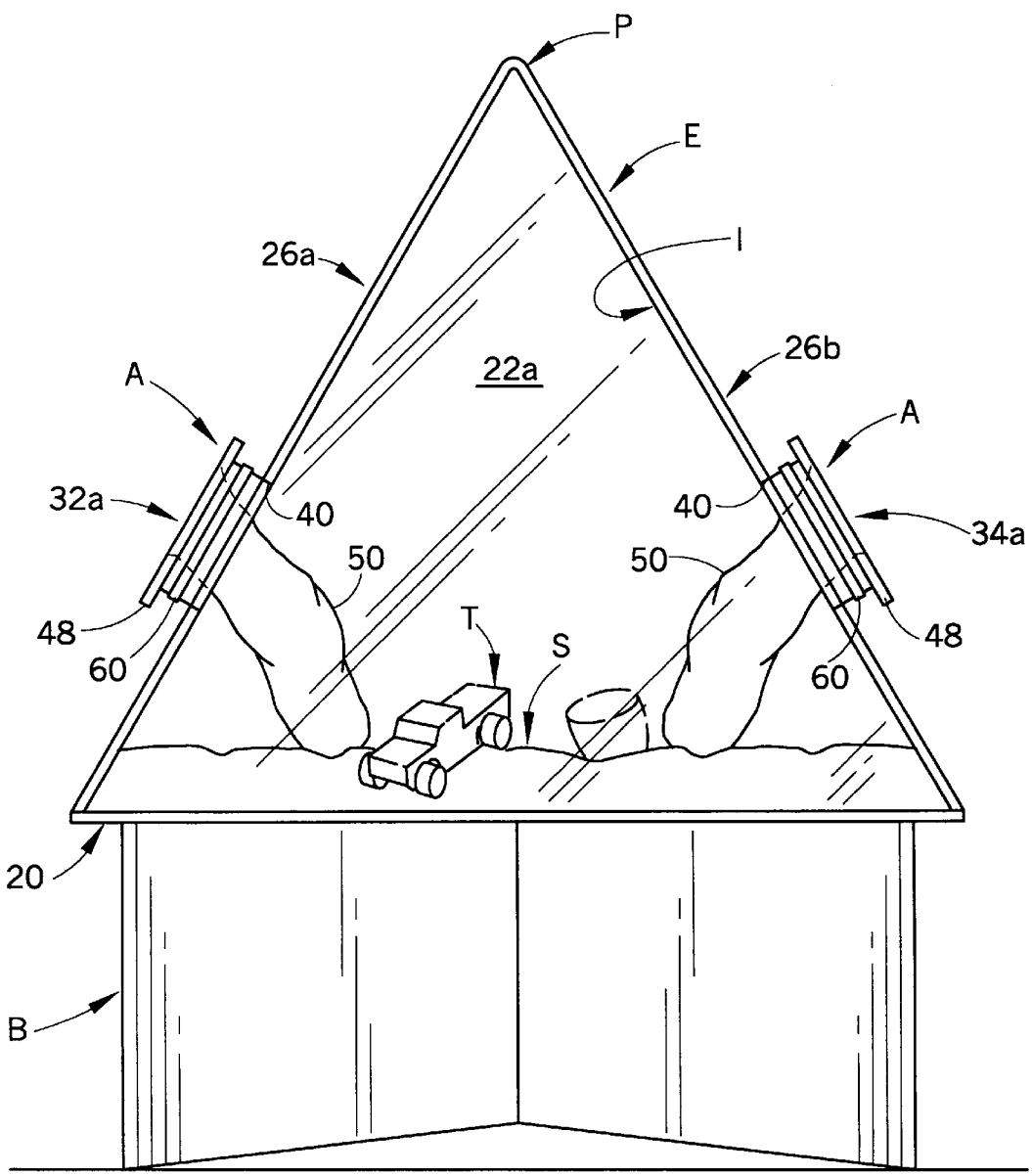
FIG. 2 is a side elevational view of the enclosure of FIG. 1, the opposite side being substantially identical.
Figure 3:
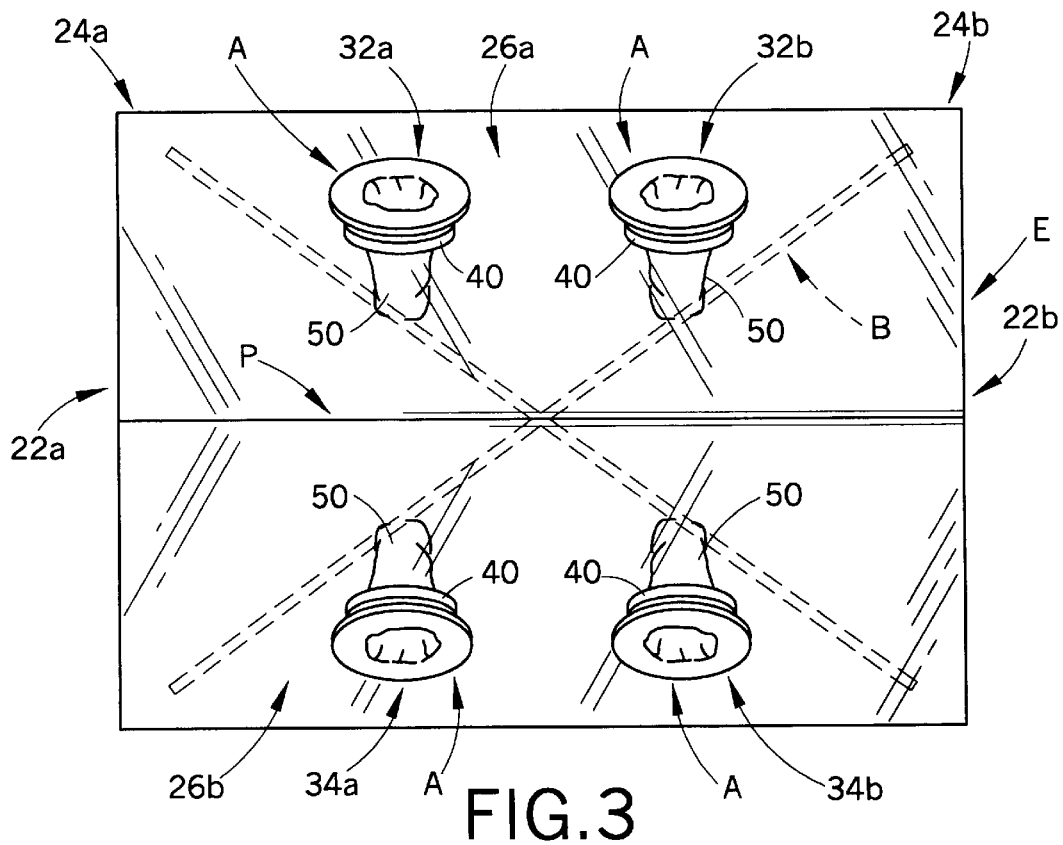
FIG. 3 is a top plan view of the enclosure of FIG. 1.
Figure 4:
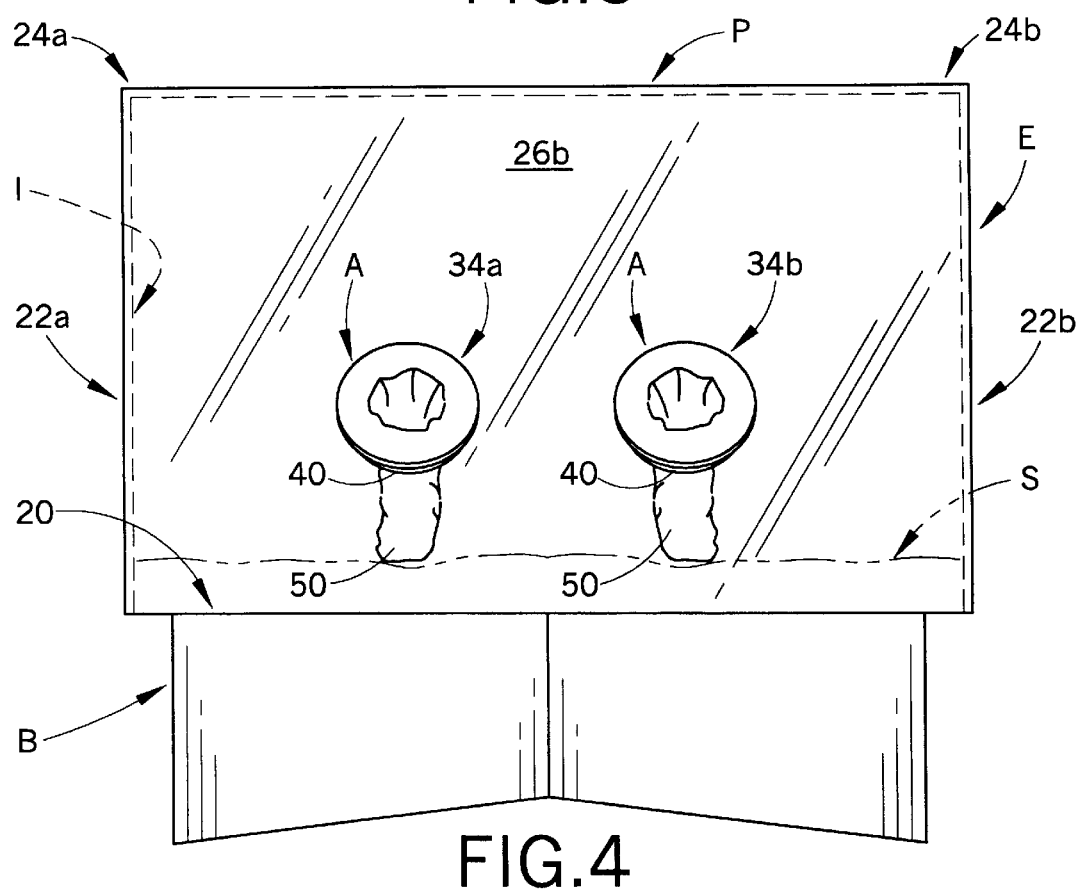
FIG. 4 is a front elevational view of the enclosure of FIG. 1, the rear elevational view being substantially identical.

The present invention will now be described with reference to the drawings, wherein the showings are for purposes of illustrating preferred embodiments only and not for purposes of limiting same. FIGS. 1–4 illustrates a portable enclosure E formed in accordance with a first embodiment of the present invention and defining a hollow, interior region I adapted for holding sand S (natural sand and/or any other flowable particulate matter) and toys T therein. The enclosure E is preferably supported above a floor, counter, or other support surface upon a base B. As shown in FIGS. 1–4, the base B is defined in an X-shaped conformation that has been found to be highly stable while, at the same time, providing sufficient room beneath the enclosure E for a user's legs and feet. Of course, the base B may be provided in a wide variety of other suitable sizes and shapes, and it is not intended that the invention be limited to any particular size/shape of base.

Preferably, the enclosure E is constructed entirely from transparent materials such as glass or plastic, although other materials may alternatively/additionally be used to construct select portions of the enclosure E. Preferred transparent materials include LEXAN® or acrylic plastics formed into planar panels. These panels are preferably solvent-welded, adhesively bonded, and/or otherwise fixedly secured to each other with fasteners or by a friction-fit to form rigid and, preferably, permanent connections therebetween so as to define the enclosure E in any desired overall shape. Whatever method used to interconnect the panels that define the enclosure E, it is important that the panels be joined in a manner that prevents escape of sand through the joints between connected panels. As is discussed in more complete detail below, the enclosure E is preferably constructed from transparent materials so that a person outside of the enclosure E may have a clear, undistorted view of the sand S and toys T in the interior region I, and also through the enclosure E, itself.

The embodiment of the enclosure E illustrated in FIGS. 1–4 is defined by a plurality of planar panels including a horizontally extending floor panel 20, and first and second end wall panels 22a,22b projecting upwardly from the floor panel 20 on first and second opposite ends 24a,24b of the enclosure E. The end panels 22a,22b are interconnected by the floor panel 20 and by first and second side wall panels 26a,26b. The side wall panels 26a,26b are each joined to the floor panel 20 and project upwardly therefrom in a manner converging toward each other so as to define a peak P of the enclosure E where the side walls 26a,26b are joined together. Preferably, the side walls 26a,26b are defined from a single panel as a one-piece construction, with the peak P formed by a crease or fold in the single panel. As is apparent from an inspection of FIGS. 1–4, the described construction for the enclosure E is highly desirable due to the large, uninterrupted expanse of each side wall panel 26a,26b that facilitates viewing sand S and toys T housed in the interior I of the enclosure E and that facilitates viewing entirely through the enclosure E, itself.

The enclosure E comprises a plurality of arm access assemblies A that allow a child or other user to access the interior I of the enclosure E with his or her arms and hands for purposes of playing with or otherwise manipulating the sand S, toys T, or other objects housed therein. More particularly, the arm access assemblies A provide access to the enclosure interior I without allowing a user to remove sand S, toys T, or any other objects therefrom.

Preferably, at least two pairs of arm access assemblies A are provided, with the members of each pair arranged to accommodate the left and right arms of a user, respectively. This allows multiple users to play with the sand S and toys T simultaneously. Thus, as shown herein, a first pair of arm access assemblies 32a,32b, are provided in association with the first side wall 26a of the enclosure, and a second pair of arm access assemblies 34a,34b are provided opposite the first pair 32a,32b in association with the second side wall 26b. The members 32a,32b and 34a,34b of each pair are spaced apart from each other a distance that approximates the distance separating a child's arm so that a child may comfortably place his/her left and right arms in the arm access assemblies 32a,32b or 34a,34b, respectively. As noted, the pairs of arm access assemblies A are preferably arranged directly opposite each other so that the users manipulating sand S and toys T in the enclosure E by way of the arm access assembly pairs 32a,32b and 34a,34b can see each other through the transparent panels 26a,26b and can play together, if desired, in a particular section of the interior I. Of course, other arm access assemblies A can be formed through the end walls 22a,22b or the side walls 26a,26b without departing from the overall scope and intent of the present invention.

Figure 5:
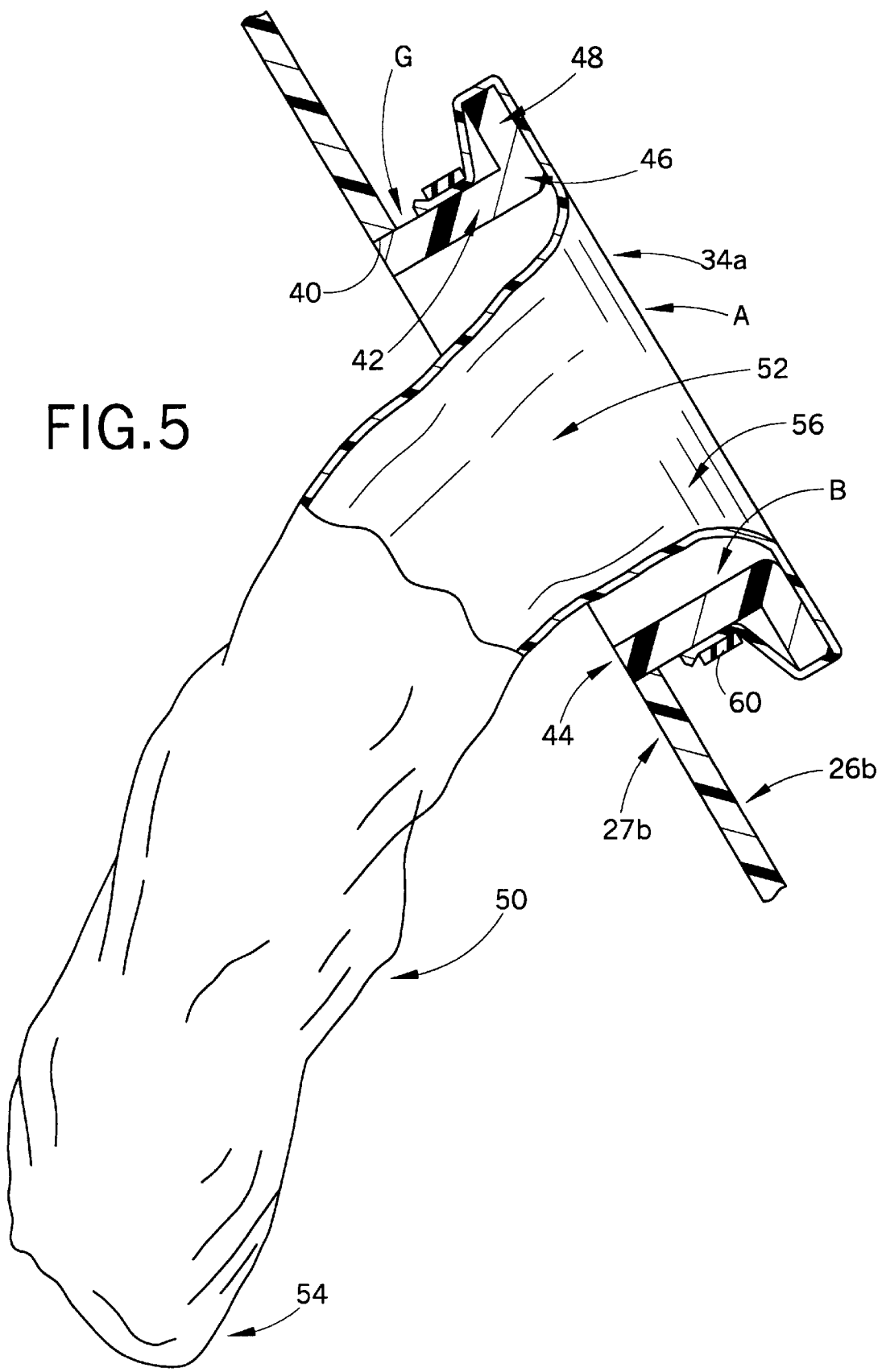
FIG. 5 is an enlarged view, partially in cross-section and partially in elevation, of a sleeve member and its attachment to an enclosure formed in accordance with the present invention.

With reference now also to FIG. 5, the construction of each arm access assembly A is described in detail. Each arm access assembly A is preferably identically constructed by forming an opening, such as a circular opening 40 through one of the panels 22a,22b,26a,26b, as desired (the panel 26b is illustrated in FIG. 5 as an example). A cylindrical hub 42 is fixedly secured in the opening 40 by solvent welding, adhesive, fasteners, or other suitable convenient means. An inner end 44 of the hub 42 is preferably placed at least substantially flush with an inner surface 27b of the panel 26b so that the inner end 44 of the hub 42 does not interfere with arm movement within the interior I of the enclosure E. An opposite, outer end 46 of the hub 42 projects outwardly from the panel 26b, away from the enclosure E and forms a boss to which a flexible arm sleeve 50 is fixedly secured. More particularly, the outer end 46 of the hub 42 preferably defines or includes a flange 48 that extends parallel to the panel 26*b*. Thus, a sleeve retaining annular groove G is defined by and between the hub 42, the flange 48, and the panel 26*b*. The hub 42 defines a central bore B that is dimensioned to accommodate a child's or an adult's arm freely.

The sleeve 50, itself, is defined by a thin, elongated, flexible tubular fabric construction that defines a central passage 52 dimensioned to accommodate a child's arm. The sleeve 50 is sufficiently long so that at least a substantial portion of the length of a child's arm is receivable therein. In a preferred embodiment, the sleeve 50 is formed from flexible, pliable spandex, nylon, and/or other suitable breathable, flexible, resilient fabric or other material that stretches to accommodate a child's arm and movement of same. Further, the material from which the sleeve 50 is constructed is impervious or at least substantially impervious to the sand S so that sand S retained in the enclosure E cannot escape by passing through a sleeve 50, but that also allows the passage of air therethrough.

In its operative position, connected to the arm access assembly A, the sleeve 50 lies substantially within the interior I of the enclosure. A first, innermost end 54 of the sleeve 50 defines a simple closed end as shown or, optionally, defines a closed glove or mitten shape specifically adapted to receive a child's hand. In any case, the end 54 is closed to prevent passage of objects into the enclosure E through the sleeve passage 52, and to prevent escape of sand S or other objects housed within the enclosure through the passage 52 of the sleeve 50. A second, outer end 56 of the sleeve defines an open end of the sleeve central passage 52. This second end 56 is adapted for secure interconnection with the hub 42 of the arm access assembly A. More particularly, as illustrated in FIG. 5, the second end of the sleeve 50 is pulled out of the bore B of the hub 42, over the flange 48, and into the annular groove G. To fixedly secure the sleeve in this operative position as shown in FIG. 5, an annular band 60, a C-clip, or other suitable convenient fastener is used to trap and retain the sleeve 50 in the groove G. In one preferred embodiment, the fastener 60 is provided by an electrical cable tie that, once tightened, is not able to be loosened without being cut. Such a band 60 prevents unintentional or unauthorized removal of the sleeve 50 once same is secured in its operative position as shown. Regardless of the type of fastener 60 employed to secure the sleeve 50 in its operative position, the fastener 60 must tightly secure the sleeve 50 in the groove to prevent passage of sand between the sleeve and the hub 42 in the groove G.

If desired, an adult or other authorized person can selectively disconnect one or more sleeves 50 from their respective arm access assemblies A for purposes of adding/removing sand S, toys T, or other objects to/from the interior I of the enclosure E through the bore B defined in each hub 42.

Figure 6:
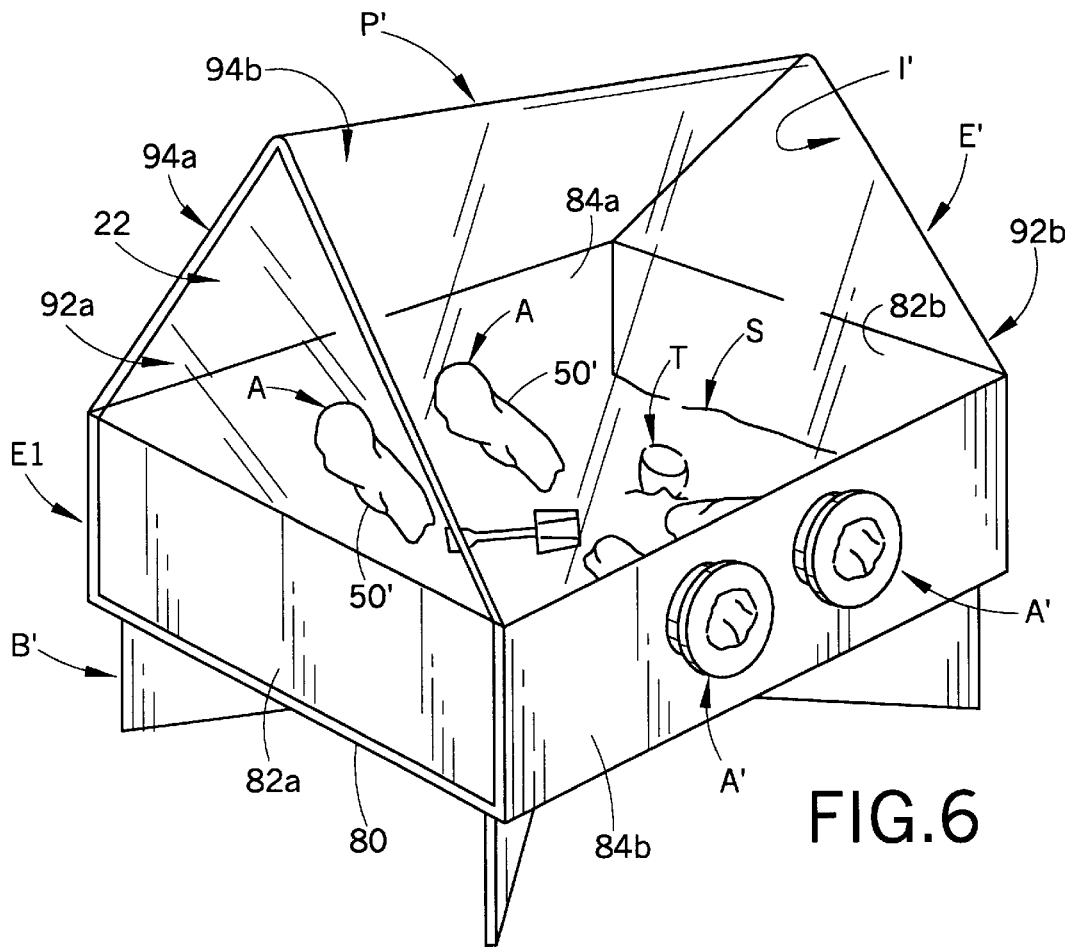
FIG. 6 is a perspective view of a portable enclosure for sand and toys formed in accordance with an alternative embodiment of the present invention.

Referring now to FIG. 6, an alternative portable enclosure E' for sand and toys formed in accordance with the present invention is illustrated. Except as shown and described herein, the enclosure E' is the same as or substantially similar to the enclosure E. Accordingly, like components are identified with like reference numerals/letters including a primed (') suffix. The enclosure E' is preferably constructed entirely from transparent panels that define a hollow interior region I' that receives sand S, toys T, and other objects as desired. The enclosure E' is supported upon a base B' that is identical to the base B described above.

A primary difference between the enclosure E and the enclosure E' is its overall shape. The enclosure E' defines a rectangular box-like lower portion E1 comprising a floor panel 80, end walls 82*a*,82*b* located at opposite ends of the floor panel 80, and side walls 84*a*,84*b* located on opposite lateral sides of the floor panel 80, all projecting vertically upwardly from the floor panel 80. The upper portion E2 of the enclosure E' is fixedly secured to the lower portion E1 and comprises end walls 92*a*,92*b* connected to the end walls 82*a*,82*b*, and side walls 94*a*,94*b* connected to the side walls 84*a*,84*b*, respectively, all of which panels 92*a*,92*b*,94*a*,94*b* are interconnected so that sand S cannot escape the interior I' of the enclosure E'. The side walls 94*a*,94*b* converge toward each other in a direction moving away from the floor panel 80 and meet to define a peak P'. The side walls 94*a*,94*b* are preferably defined from a single panel as a one-piece construction that is bent or folded to define the peak P'. At least one pair, and preferably at least two pairs of arm access assemblies A are defined through the enclosure E', preferably through the side walls 84*a*,84*b* as illustrated.

Figure 7:
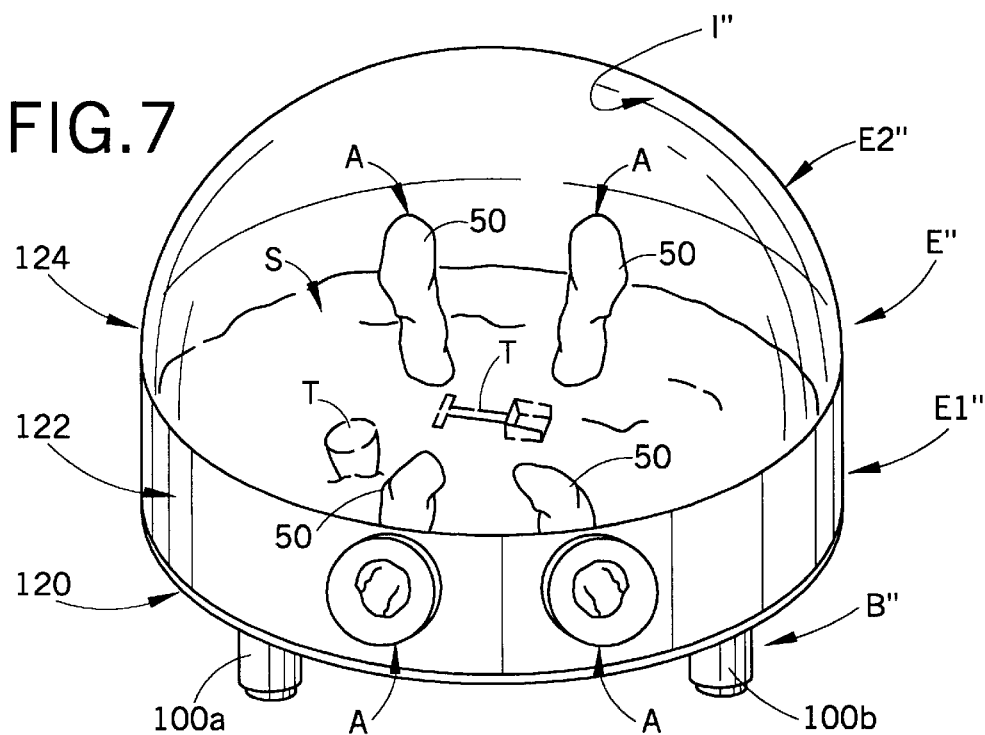
FIG. 7 is a perspective view of a portable enclosure for sand and toys formed in accordance with another alternative embodiment of the present invention.

Referring now to FIG. 7, a third embodiment of a portable enclosure E" for toys and sand formed in accordance with the present invention is illustrated. Except as shown and described, the enclosure E" is similar in all respects to the enclosures E,E'. Thus, like components relative to the enclosure E' are identified with like reference numerals and letters including a double-primed (") suffix. The enclosure E" is also preferable defined entirely from transparent plastic or glass and is supported upon a base B" comprising a plurality of legs 100*a*,100*b*. The enclosure E", itself, is defined by a lower portion E1" and an upper portion E2" that are interconnected. The lower portion preferably comprises a horizontally extending floor panel 120 and a cylindrical wall member 122 that projects vertically upwardly from the periphery of the floor member 120. Plural pairs of arm access assemblies A are formed through the cylindrical member 122. The upper portion E2" of the enclosure E" is preferably a downwardly opening dome-shaped member defined as a one-piece construction. This overall conformation of the enclosure E" is highly aesthetically pleasing and is extremely safe, given the lack of any sharp corners or other portions that could inflict injury to a child.

Those of ordinary skill in the art will recognize that the illustrated enclosures E,E',E" are examples only, and that modifications and alterations can be made thereto without departing from the overall scope and intent of the invention. For example, although the enclosures have been shown and described with four arm access assemblies A (two pairs), it is contemplated that six (6), eight (8) or more arm access assemblies could be provided depending on the overall size of the enclosure E,E',E" so that three, four, or more people may play with the sand S and toys T simultaneously. Further, although the invention has been described primarily for use by children, it may also be used by others, such as adults in need of therapy or amusement. Also, given that the floor panels 20,80,120 of the enclosures E,E',E" are typically entirely covered with sand, these panels need not be transparent. Also, the enclosures E,E',E" can be provided in an unassembled, kit form for final assembly by an end-user.

In operation, an adult or other authorized user loads the enclosure E,E', E" with sand S, toys T, and/or any other objects, as desired through one or more of the bores B of the arm access assembly hubs 42. Once the enclosure is loaded as desired, the authorized user places all of the sleeves 50 in their operative positions, sealed in the bores B of their respective arm access assemblies by a band 60 or the like. This, then, prevents the escape of sand or other contents of the enclosure.

A child or other user is then able to place his/her left and right arms into the sleeves 50 of first and second arm access assemblies A forming a pair. The user is then able to manipulate the sand S, toys T, or other objects housed in the enclosure E,E',E" by grasping or otherwise acting on same through the innermost end 54 of the sleeves 52 into which his/her arms have been inserted. As noted above, neither the sand S nor the toys T or other objects can escape the enclosure by way of the arm access assemblies A when the sleeve 50 of each arm access assembly is secured in its operative position as illustrated.

The invention has been described with reference to preferred embodiments. Of course, modifications and alterations will occur to others upon a reading and understanding the preceding specification. It is intended that the invention be construed as including all such modifications and alterations insofar as they are encompassed by the appended claims and equivalents thereof.

Having thus described the preferred embodiments, what is claimed is:

1. A method of providing a no-mess play area for children comprising:

providing an at least partially transparent enclosure defining a hollow interior region;

placing at least one of loose toys and sand within said hollow interior region and sealing said enclosure to prevent escape of said at least one of loose toys and sand therefrom;

providing a first pair of arm access assemblies including first and second arm access assemblies connected to said enclosure and spaced relative to each other so as to be adapted for respective simultaneous receipt of left and right arms of a first child, each of said arm access assemblies comprising a flexible sleeve sealingly positioned in an opening in said enclosure and extending into said hollow interior region of said enclosure, each of said sleeves defining a central passage adapted for receipt of one of said left and right arms of said first child and a closed innermost end within said hollow interior region.

2. The method of providing a no-mess play area for children as set forth in claim 1, wherein said flexible sleeves provided as part of said first and second arm access assemblies are substantially impervious to said sand within said hollow interior region of said enclosure but allow the passage of air therethrough.

3. The method of providing a no-mess play area for children as set forth in claim 1, further comprising:

providing a second pair of arm access assemblies including first and second arm access assemblies connected to said enclosure and spaced relative to each other so as to be adapted for respective simultaneous receipt of left and right arms of a second child, each of said arm access assemblies comprising a flexible sleeve sealingly positioned in an opening in said enclosure and extending into said hollow interior region of said enclosure, each of said sleeves defining a central passage adapted for receipt of one of said left and right arms of said second child and a closed innermost end within said hollow interior region.

4. The method of providing a no-mess play area for children as set forth in claim 3, wherein said first and second pairs of arm access assemblies are arranged on opposite sides of said transparent enclosure so that first and second children respectively using said first and second pairs of arm access assemblies can view each other through transparent portions of said enclosure.

5. A method of playing comprising:

partially filling a hollow interior region of an enclosure with at least one of toys and sand, said enclosure including at least a transparent portion;

providing at least one arm access assembly that provides access to said hollow interior region for purposes of manipulating said sand, said arm access assembly including a sleeve adapted for receipt of an arm of a user;

placing an arm and hand of a user into said sleeve, said sleeve closed to said hollow interior region of said enclosure to prevent direct contact between said hand of said user and said at least one of said toys and sand;

playing with said at least one of said toys and sand with said hand by indirect contact through said sleeve while simultaneously viewing said at least one of toys and sand and said sleeve through said transparent portion of said enclosure.

6. A play area comprising:

an enclosure defining a hollow interior region adapted for receipt of at least one of toys and sand, at least a portion of said enclosure defined from a transparent material;

a first pair of arm access assemblies including first and second arm access assemblies connected to said enclosure and spaced relative to each other so as to be adapted for respective receipt of left and right arms of a first child, each of said arm access assemblies comprising a flexible sleeve defined from a breathable material that allows the passage of air therethrough and having a first end sealingly positioned in an opening in said enclosure and a closed second end extending into said hollow interior region of said enclosure, each of said sleeves adapted for receipt of one of said left and right arms of said first child.

7. The play area for children as set forth in claim 6, further comprising:

a second pair of arm access assemblies including first and second arm access assemblies connected to said enclosure and spaced relative to each other so as to be adapted for respective receipt of left and right arms of a second child, each of said arm access assemblies comprising a flexible sleeve having a first end sealingly positioned in an opening in said enclosure and a closed second end extending into said hollow interior region of said enclosure, each of said sleeves adapted for receipt of one of said left and right arms of said second child.

8. The play area for children as set forth in claim 7, wherein said flexible sleeves provided as part of said first and second pairs of arm access assemblies are substantially impervious to sand.

9. The play area for children as set forth in claim 7, wherein said first and second pairs of arm access assemblies are arranged on opposite sides of said enclosure, and wherein said enclosure is substantially transparent so that first and second children respectively using said first and second pairs of arm access assemblies can view each other through said enclosure.

10. The play area for children as set forth in claim 6, wherein said first and second arm access assemblies each comprise:

a cylindrical hub projecting outwardly from a wall of said enclosure, said hub defining a bore in communication with said hollow interior region;

a flange connected to a outer portion of said hub, wherein said first end of said flexible sleeve extends out of said bore of said hub and is stretched over said flange; and, a fastener placed over said stretched first end of said sleeve so that said first end of said sleeve is frictionally secured between said fastener and said hub.

11. The play area for children as set forth in claim 6, wherein said enclosure is defined by a plurality of panels comprising:

a horizontally extending floor panel;

first and second transparent end wall panels projecting vertically upwardly on opposite first and second ends of said floor panel;

first and second transparent side wall panels projecting upwardly on opposite lateral sides of said floor panel and interconnecting said first and second end wall panels, said first and second side wall panels converging toward each other in a direction moving upwardly away from said floor panel and interconnected to define a peak, wherein said first pair of arm access assemblies is connected to one of said first and second side wall panels.

12. The play area for children as set forth in claim 6, wherein said enclosure is defined by a plurality of members comprising:

a horizontally extending floor panel;

a cylindrical wall panel projecting vertically upwardly from said floor panel; and, a dome member connected to said cylindrical wall panel so that said hollow interior region is defined by and between said floor panel, said cylindrical wall member, and said dome member, wherein said first pair of arm access assemblies is connected to said cylindrical wall member.

13. A play area comprising;

at least one of toys and sand;

a closed container formed of panels including top, bottom, and side panels defining a hollow interior chamber for holding the at least one of toys and sand;

first and second openings in one of said panels, the openings being proportioned to receive a child's left and right hands and arms, respectively;

first and second flexible sleeve affixed to said first and second openings and extending into the hollow interior region enclosed by the container, said sleeves adapted for respective receipt of said child's left and right hands and arms and defining a closed innermost end.

14. The play area as set forth in claim 13, wherein both toys and sand are positioned in the hollow interior region of the container.

15. The play area as set forth in claim 13, further comprising:

first and second bosses projecting outwardly from said panel that define said first and second openings and respectively surrounding said openings, wherein said first and second sleeves extend out of said openings and include outermost portions that are stretched over and lie adjacent said first and second bosses, respectively;

first and second sleeve attachment members placed in surrounding relation with said first and second bosses and said outermost portions of said first and second sleeves to secure said first and second sleeves to said first and second bosses, respectively.

16. The play area as set forth in claim 15, further comprising:

first and second flanges connected to said first and second bosses so that first and second sleeve retaining grooves are defined by said panel that defines said openings, said first and second bosses, and said first and second flanges, respectively.

17. A play area comprising:

an at least partially transparent enclosure defining an interior region;

at least one of toys and sand placed in said interior region of said enclosure;

at least one arm access assembly connected to said enclosure and comprising a flexible sleeve having a first end sealingly positioned in an opening defined in said enclosure and a closed second end, said sleeve adapted for receipt of either one of a left and right arm of a user whereby a user can manipulate said at least one of toys and sand within said enclosure.

* * * * *